United States Patent [19]
Marsh, Jr., deceased

[11] 4,450,969
[45] May 29, 1984

[54] TOP-GATE ASSEMBLY

[76] Inventors: William E. Marsh, Jr., deceased, late of New Braunfels, Tex.; by Elizabeth A. Marsh, executrix, 174 Green Valley, East, New Braunfels, Tex. 78130

[21] Appl. No.: 319,597

[22] Filed: Nov. 9, 1981

[51] Int. Cl.³ .............................................. B01D 23/24
[52] U.S. Cl. ..................................... 211/189; 280/79.3
[58] Field of Search ............... 280/79.3; 211/189, 126, 211/134

[56] References Cited

U.S. PATENT DOCUMENTS

| | | | |
|---|---|---|---|
| 3,407,941 | 10/1968 | Schmidt | 211/189 X |
| 3,861,702 | 1/1975 | Wilson | 280/79.3 X |
| 4,004,819 | 1/1977 | Brongo | 280/79.3 |
| 4,180,277 | 12/1979 | Romero | 280/79.3 |

*Primary Examiner*—Francis K. Zugel
*Assistant Examiner*—Peter A. Aschenbrenner
*Attorney, Agent, or Firm*—John C. Stahl

[57] ABSTRACT

A top-gate assembly adapted to be detachably or fixedly secured to selected portions of a standard bulk storage cart, said top-gate assembly including a plurality of protected springs connecting by a corresponding number of cables to a foot plate which is to be detachably secured to the cargo bed of said cart, thereby forming a gate therefor.

9 Claims, 13 Drawing Figures

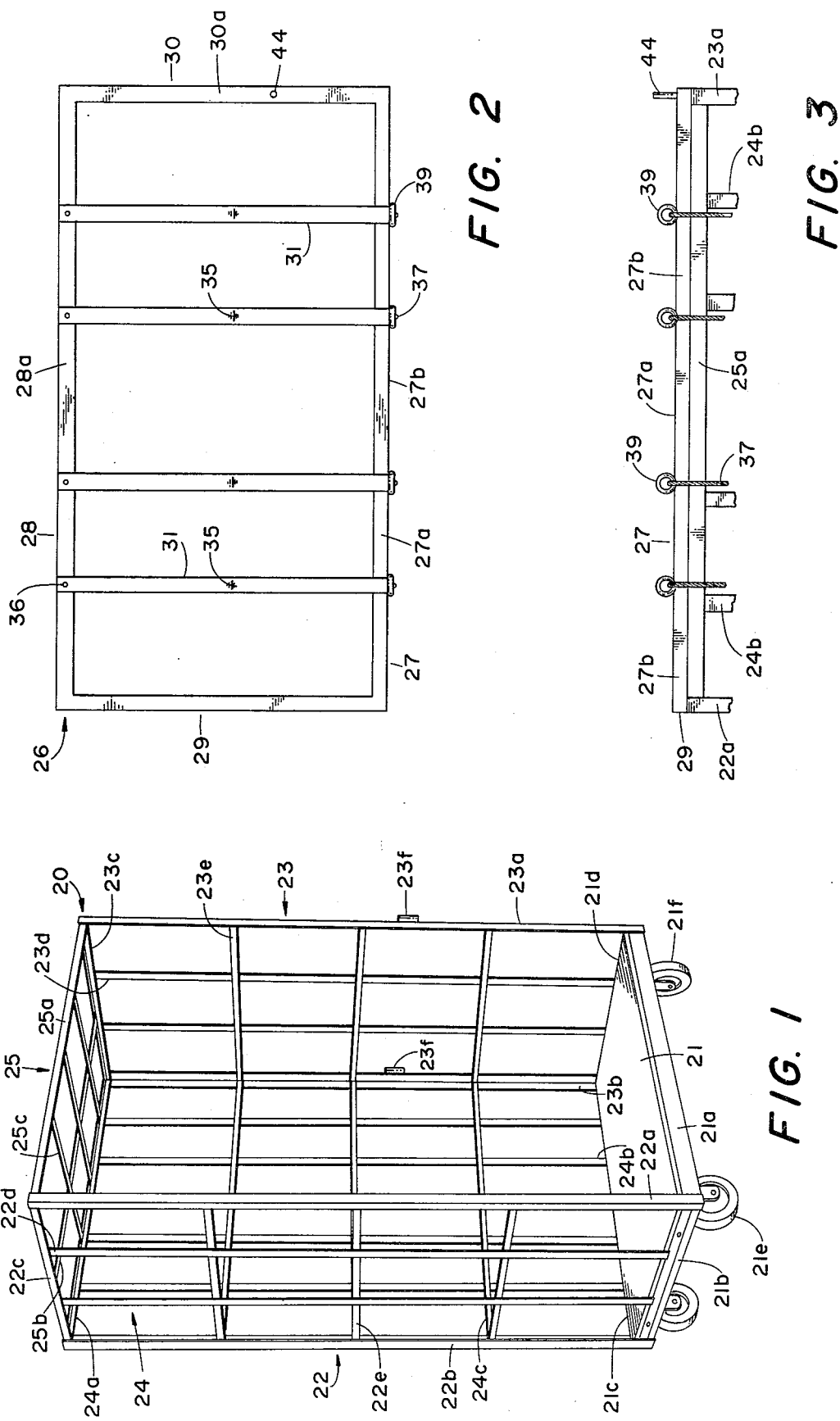

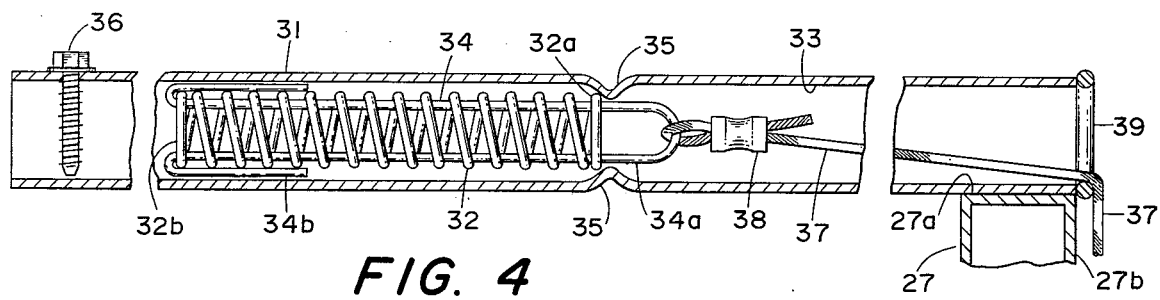
FIG. 4
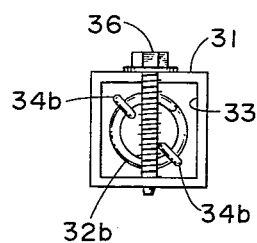
FIG. 5
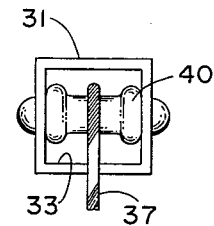
FIG. 6
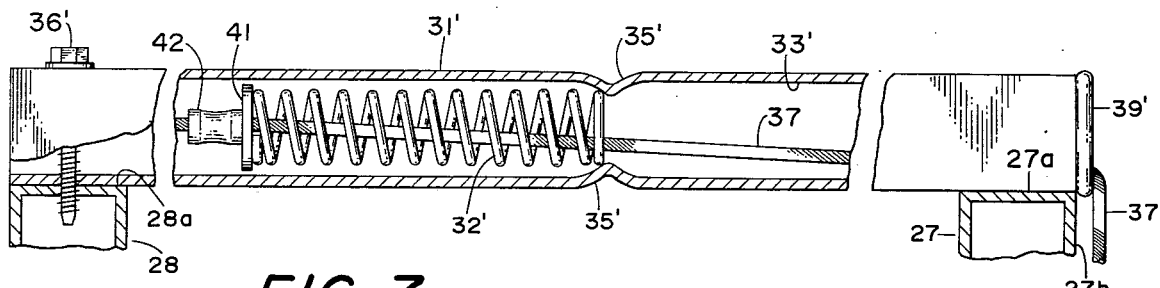
FIG. 7
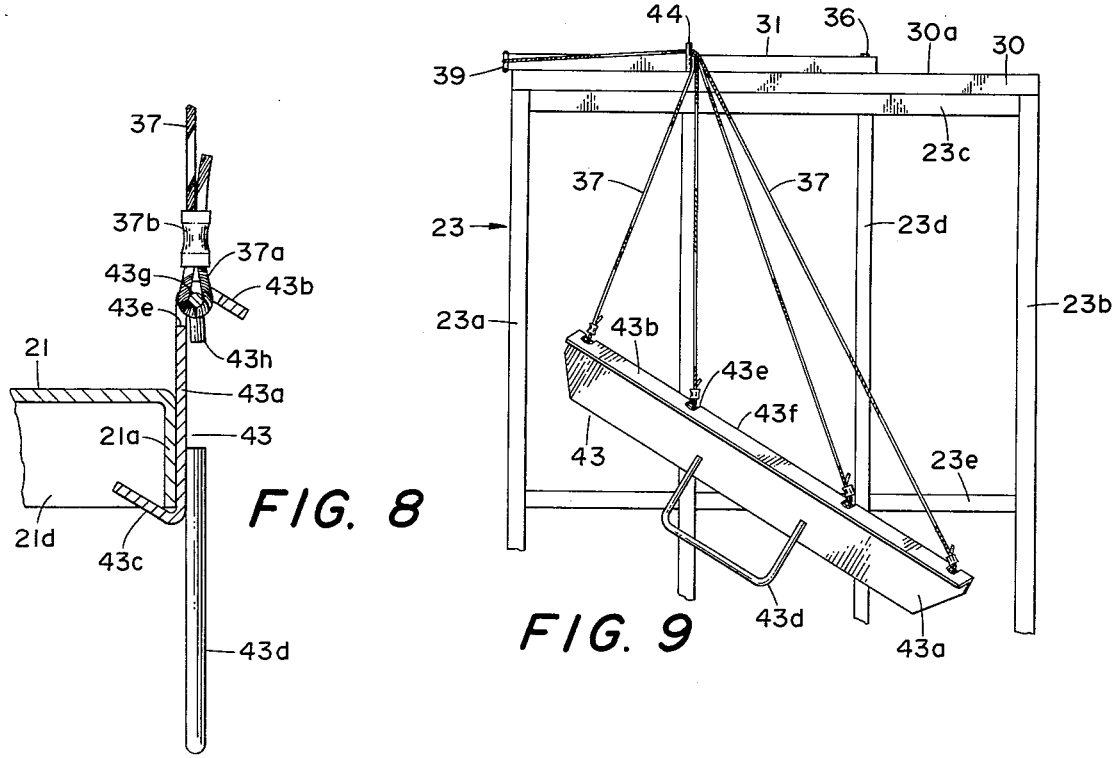
FIG. 8
FIG. 9

TOP-GATE ASSEMBLY

BACKGROUND OF THE INVENTION

In general, standard bulk storage carts are utilized as mobile containers for transporting stacked products from a production facility or warehouse to a retail outlet, for displaying the stacked products at such retail outlet, and also collecting empty returnable packages at the retail outlet. U.S. Pat. No. 3,861,704 includes a comprehensive survey of the prior art, including the use of dollies, trucks and carts, especially those designed to carry cases of soft drinks and the like.

SUMMARY OF THE INVENTION

The principal object of the invention is to provide a top-gate assembly which is adapted for use with all standard bulk storage carts designed for the soft drink industry.

Another object is to provide such a top-gate assembly which is of rigid, durable construction yet is attractive in design, a desirable feature when used in a retail outlet.

Still another object is to provide such a top-gate assembly which is capable of mass production techniques, relatively inexpensive to manufacture, easy to use and maintain in operable condition, and universal in its adaptability.

Other objects and features of the invention will become apparent to those skilled in the art from a consideration of the following specification when read in the light of the annexed drawings.

BRIEF DESCRIPTION OF THE DRAWINGS

FIG. 1 is a front perspective view of a bulk storage cart of the prior art.

FIG. 2 is an enlarged top plan view of a top-gate assembly of the subject invention adapted to be secured to the top of the cart of FIG. 1.

FIG. 3 is a fragmentary, enlarged front elevational view of the embodiment of FIG. 2, secured to the top of the cart of FIG. 1.

FIG. 4 is a greatly enlarged vertical sectional view, partly broken away, through a preferred embodiment of tubular member of the subject invention.

FIG. 5 is a greatly enlarged rear elevational view of the tubular member of FIG. 4.

FIG. 6 is a front elevational view showing a modification of the front end of the tubular member of FIG. 4.

FIG. 7 is a greatly enlarged side elevational view, partly broken away and partly in section, of another embodiment of tubular member.

FIG. 8 is a greatly enlarged vertical sectional view through the foot plate and base of the subject invention.

FIG. 9 is a fragmentary, side elevational view, showing the cables and foot plate in stored condition against the right wall of the cart of FIG. 1.

DESCRIPTION OF PREFERRED EMBODIMENTS

Figure 10:
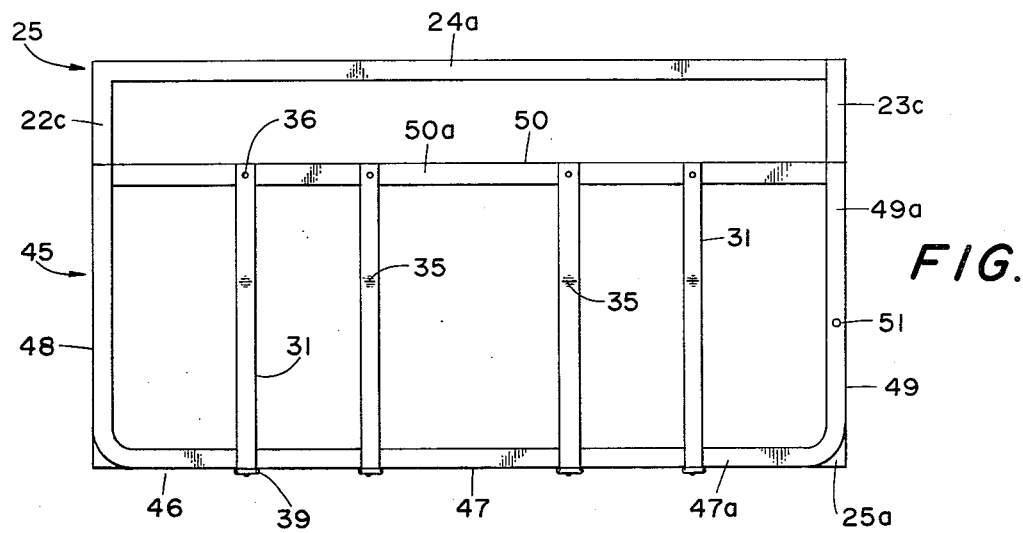
FIG. 10 is an enlarged top plan view of another embodiment of top-gate assembly, secured to the top of the cart of FIG. 1.

Referring now to the drawings, wherein like reference characters designate like or corresponding parts throughout the several views, there is shown in FIG. 1 a standard bulk cart 20 of the type illustrated and described in U.S. Pat. No. 3,861,704 comprising flat cargo bed 21, opposing left and right walls 22–23, back wall 24, and top 25.

More specifically, cargo bed 21 includes downwardly depending flanges 21a–21d, two rigid casters 21e mounted on the undersurface thereof in proximity to left wall 22, and two swivel casters 21f mounted in proximity to right wall 23. Left wall 22 includes front post 22a, rear post 22b, top rail 22c, intermediate vertical members 22d and spaced, horizontal braces 22e. Right wall 23 consists of front post 23a, rear post 23b, top rail 23c, intermediate vertical members 23d, spaced horizontal braces 23e, and a pair of lock pin bushings 23f mounted on the medial, most lateral surface of posts 23a, 23b. Backwall 24 includes top rail 24a, intermediate vertical members 24b, and spaced horizontal braces 24c. Top 25 consists of front rail 25a, member 25b lying in the medial, major plane of said cart, and cross members 25c.

Henceforth throughout the specification and drawings, member 25b and cross members 25c of top 25 will not be illustrated, primarily to avoid confusion; it is to be understood, however, that such members are not necessarily removed prior to attaching the several embodiments of top-gate assembly of the subject invention to top 25 of said cart.

There is shown in FIG. 2 of the drawings one embodiment of top-gate assembly 26 of the subject invention, conforming in shape and size, and adapted to overlie the corresponding rails 22c, 23c, 24a and 25a, respectively, of top 25 of said cart. More specifically, assembly 26 is essentially rectangular in plan, preferably of integral construction and of tubular or bar stock, consisting of front cross piece 27, back cross piece 28, and opposing sides 29–30, each of which lie in the same plane. A plurality of transversely extending, laterally spaced tubular members 31 are fixedly secured to said cross piece 27 and back cross piece 28, respectively; each of said tubular members is positioned approximately vertically above the normal position of the several soft drink cases carried on cargo bed 21. As viewed in FIG. 4, each tubular member 31 overlies top 27a of cross piece 27 and terminates at least slightly anteriorly of the vertical plane of face 27b thereof; rearwardly, each tubular member 31 preferably overlies top 28a of back cross piece 28 and is secured thereto.

Compression spring 32 is carried in bore 33 of said tubular member, said spring normally lies on its side when no force is applied thereto; an elongated generally U-shaped draw bar 34 is carried in said spring with bight 34a extending at least slightly forwardly of foremost coil 32a of said spring; opposing and forwardly directed hooks 34b on the remote end of said draw bar are adapted to partially pass around rearmost coil 32b of said spring. As viewed in FIG. 5, draw bar 34 desirably extends diagonally across bore 33 and is used to uniformly compress spring 32 in a manner hereinafter to be described.

Opposing depressions 35 or other stop means are provided in the approximate medial portion of each tubular member 31 and serve as a forward limit stop for spring 32; screw 36 is passed through opposing walls of member 31 at any position at least slightly rearwardly of spring 32 and preferably through the rearmost end thereof into at least said back cross piece 28 to prevent accidental discharge of said spring in the event of cable malfunction and to minimize theft of such springs.

One end of cable 37 is passed through bight 34a of said draw bar, turned back upon itself and collar 38 or other securing means passed around such parts and crimped or otherwise fastened. Ring 39, desirably secured to the foremost end of tubular member 31, serves as a bearing surface and minimizes damage to cable 37 passing therethrough. In the modification of FIG. 6, a transversely extending roller 40 is mounted in the foremost end of said tubular member 31 with cable 37 passing thereover for such purpose.

There is shown in FIG. 7 of the drawings another embodiment of tubular member 31′ which may be secured forwardly to front cross piece 27 and rearwardly to back cross piece 28, or to an intermediate cross piece, as shown in FIG. 10 of the drawings. In such embodiment, compression spring 32′ is carried in bore 33′ rearwardly of the opposing depressions 35′ or other forward stop means. Cable 37 is passed rearwardly through said spring and thence through washer 41 or the like with collar 42 or other securing means carried on the approximate end of said cable.

Foot plate 43 (see FIGS. 8 and 9) is connected to the remote end of each cable 37. Plate 43, of flat metallic stock and at least slightly greater in length than the corresponding distance between the most lateral tubular members 31 of top-gate assembly 26, consists of longitudinally and vertically extending section 43a adapted to bear against the medial portion of flange 21a in the secured condition; section 43a terminates upwardly in a forwardly and angularly downturned lip 43b, and downwardly in a rearwardly and angularly upturned lip 43c adapted to engage flange 21a. Downwardly depending handle 43d is secured to the medial, outer surface of section 43a. A plurality of longitudinally spaced, vertically extending slots 43e are provided in radius 43f formed between sections 43a and lip 43b.

A loop 37a is to be formed at a predetermined location on the remote end of each cable 37 by turning said cable back upon itself and securing the same by collar 37b or the like. Elongated rod 43g, terminating laterally in short perpendicular legs 43h, is passed through each such loop 37a, said rod normally lies in the interior angle formed between section 43a and lip 43b.

It is understood that top-gate assembly 26 thus formed is detachably or fixedly secured, in a conventional manner, to top 25 of cart 20.

The user may depress foot plate 43 by exerting a downward force upon handle 43d thereby causing spring 32 or 32′ remotely connected thereto to compress; at such time the user moves plate 43 rearwardly against flange 21a with lip 43c passing therebelow. Upon releasing such downward force, lip 43c engages flange 21a, said compression springs return to normal condition, cables 37 are drawn taut, and an effective gate is provided for such cart.

When the gate thus formed is not in use, as illustrated in FIG. 9, foot plate 43 is conveniently secured in an out-of-the-way position. More particularly, vertically extending pin 44 is secured to the top or either side of top rail 23c in approximate vertical alignment with the foremost intermediate vertical member 23d of right wall 23. Cables 37 may conveniently be passed rearwardly of said pin 44 with foot plate 43 lying flat against said right wall.

Figure 11:
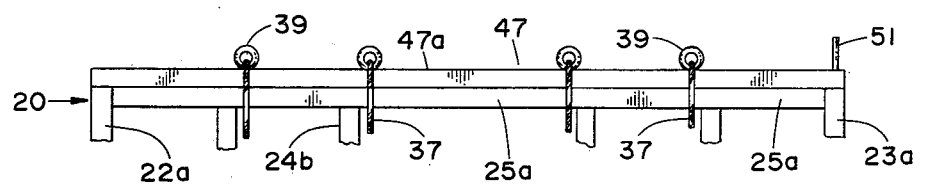
FIG. 11 is a fragmentary, enlarged front elevational view of the embodiment of FIG. 10, secured to the top of the cart of FIG. 1.

Referring now to FIGS. 10–11 of the drawings, top-gate assembly 45 includes U-shaped member 46 consisting of cross piece 47 and perpendicularly rearwardly extending left and right side members 48–49, each lying in the same plane. Cross piece 47 of member 46 is adapted to overlie front rail 25a, left side member 48 is adapted to at least partially overlie top rail 22c, and right side member 49 is adapted to at least partially overlie top rail 23c. Longitudinally extending cross member 50 of tubular or bar stock lies in the plane of side members 48, 49 and is butt welded or otherwise fixedly secured to the approximate rear ends thereof. A plurality of transversely extending, longitudinally spaced tubular members 31, or 31′, heretofore described in detail, are secured to top 47a of cross piece 47 and top 50a of cross member 50, respectively.

Vertically extending pin 51, corresponding to pin 44 of FIG. 2, is secured to top 49a of side member 49 in approximate vertical alignment with the foremost vertical member 23d of right wall 23.

Top-gate assembly 45 thus formed is detachably or fixedly secured to the top 25 of cart 20; the plurality of tubular members 31, or 31′, and associated cables, connecting remotely to foot plate 43, provides an effective gate for such cart.

Figure 12:
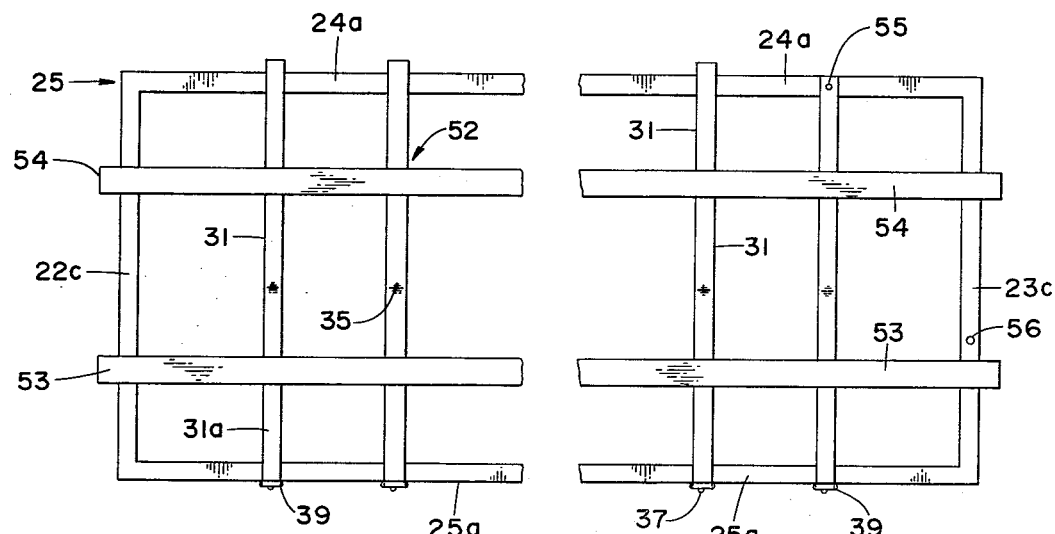
FIG. 12 is an enlarged, top plan view of still another embodiment of top-gate assembly adapted to be secured to the top of the cart of FIG. 1.
Figure 13:
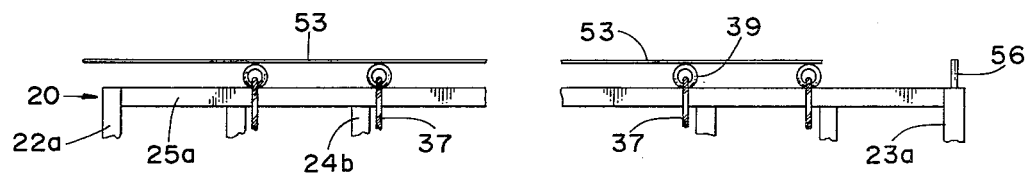
FIG. 13 is a fragmentary, enlarged front elevational view of the embodiment of FIG. 12, secured to the top of the cart of FIG. 1.

Referring now to FIGS. 12–13, top-gate assembly 52 is adapted to be used on cart 20 of any length and/or width. In such embodiment, a plurality of parallel, laterally spaced tubular members 31, 31′, heretofore described in detail, are secured together by means of spaced, parallel straps 53–54. More specifically, tubular members 31, or 31′, are desirably at least slightly greater in length than the maximum width of such type cart, while straps 53, 54 are at least slightly greater in length than the corresponding maximum length of such type cart. Strap 53, of relatively thin gauge, is tack welded or otherwise fixedly secured to top 31a of each of said tubular members approximately six inches rearwardly of the foremost end thereof; in like manner, strap 54 is tack welded to the corresponding surface of said tubular member at least slightly rearwardly of the midpoint of each such tubular member. Top-gate assembly 52 is positioned upon the top 25 of said cart in such a manner that tubular members 31 overlie rails 25a, 24a; the assembly 52 thus formed is moved laterally in such a direction that said assembly is centrally disposed, and then moved forwardly or rearwardly so that the foremost end of each such tubular member extends at least slightly anteriorly of the vertical plane of the front face of rail 25a, at which time each tubular member is welded or otherwise fixedly secured in such position. That portion of each such tubular member which overlies top rail 24a on back wall 24 is also welded or otherwise fixedly secured thereto; any portion of each such tubular member which extends posteriorly of the rear face of top rail 24a is removed, as illustrated in the upper, right-hand corner of FIG. 12. Screw 55, corresponding to screw 36 in purpose, is then passed through the opposing walls of each tubular member at least slightly rearwardly of the spring carried therein, or preferably, downwardly through such tubular member into top rail 24a. Straps 53, 54 may then be completely removed or trimmed laterally of the outermost tubular members (see FIG. 13).

A vertically extending pin 56, corresponding to pin 44 heretofore mentioned, is desirably secured to the upper surface of top rail 23c of the right wall, to secure cables 37 and foot plate 43 in out-of-the-way position.

As heretofore mentioned, a standard bulk storage cart 20 is used for transporting stacked products, especially cases of soft drinks, from a production facility or warehouse to a retail outlet, for displaying the cases of soft drinks at such retail outlet, and for collecting cases of empty bottles at the retail outlet for return to the production facility. Normally four or five full cases of soft drinks are placed in side-by-side relationship on cargo bed 21; four additional rows of full cases may also be placed in such relationship in the cart. Top-gate assemblies 26, 45 and 52 of the subject invention, when used in combination with such standard bulk storage cart, forms an effective gate therefor; cables 37 of each such embodiment bear against a selected portion of the foremost end of each such case thereby retaining the same in said cart.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. In combination with a bulk storage cart comprising a cargo bed, opposing left and right walls, back wall and top, said top including a front rail, the invention comprising:
    a top-gate assembly essentially conforming to the shape and size of said top and adapted to at least partially overlie components thereof,
    said top-gate assembly including a plurality of transversely extending and longitudinally spaced tubular members,
    a compression spring carried in each tubular member,
    forward limit stop means for said spring in each tubular member,
    spring compressing means associated with each spring,
    a cable connected at one end to each spring compressing means,
    a foot plate connected remotely to each of said cables,
    said foot plate adapted to be detachably secured to said cargo bed thereby forming a gate for said cart.

2. The invention of claim 1 wherein said top-gate assembly is essentially rectangular and adapted to be fixedly secured to the top of said cart.

3. The invention of claim 1 wherein said top-gate assembly is essentially rectangular and adapted to be detachably secured to the top of said cart.

4. The invention of claim 1 wherein said spring compressing means consists of passing said cable through said spring, a washer on said cable rearwardly of said spring, and means retaining said washer on said cable.

5. The invention of claim 1 wherein a ring is secured to the foremost end of each tubular member to accommodate the corresponding cable passing therethrough.

6. The invention of claim 1 wherein a roller is mounted in the foremost end of each tubular member to accommodate the corresponding cable passing thereover.

7. In combination with a bulk storage cart comprising a cargo bed, opposing left and right walls, back wall and top, said top including a front rail, the invention comprising:
    an essentially U-shaped top-gate assembly consisting of a cross piece and perpendicularly extending left and right side members, said cross piece adapted to overlie said front rail of said cart and extend at least slightly forwardly thereof,
    a cross member secured to the approximate rear end of each side member,
    a plurality of transversely extending and longitudinally spaced tubular members mounted on said U-shaped top-gate assembly intermediate said cross piece and said cross member,
    a compression spring carried in each tubular member,
    forward limit stop means for said spring in each tubular member,
    spring compressing means associated with each spring,
    a cable connected at one end to each spring compressing means,
    a foot plate connected remotely to each of said cables,
    said foot plate adapted to be detachably secured to said cargo bed thereby forming a gate for said cart.

8. The invention of claim 7 wherein said left side member of said top-gate assembly at least partially overlies the left wall of said cart, and said right side member at least partially overlies the right wall of said cart.

9. In combination with a bulk storage cart comprising a cargo bed, opposing left and right walls, back wall and top, said top including a front rail, a top-gate assembly comprising:
    a plurality of transversely extending and longitudinally spaced tubular members,
    first and second straps secured to selected portions of each of said tubular members,
    said first strap at least slightly rearwardly of the foremost end of each tubular member, said second strap at least slightly rearwardly of the midpoint of each tubular member,
    said top-gate assembly adapted to be placed upon the top of said cart with said foremost end of each tubular member at least slightly forwardly of said front rail,
    a compression spring carried in each tubular member,
    forward limit stop means for said spring in each tubular member,
    spring compressing means associated with each spring,
    a cable connected at one end to each spring compressing means,
    a foot plate connected remotely to each of said cables,
    said foot plate adapted to be detachably secured to said cargo bed thereby forming a gate for said cart.

* * * * *